US012276218B2

(12) United States Patent
Beecher et al.

(10) Patent No.: US 12,276,218 B2
(45) Date of Patent: Apr. 15, 2025

(54) SYSTEM FOR LIGHTING OFF AN AUXILIARY OCCUPATIONAL EMISSIONS DEVICE AND METHOD OF OPERATING THE SAME

(71) Applicant: Beecher Emission Solution Technologies, LLC, Horseheads, NY (US)

(72) Inventors: Scott H. Beecher, Horseheads, NY (US); Timothy J. Rolls, Elmira, NY (US); Robert M. Thomas, Horseheads, NY (US)

(73) Assignee: Beecher Emission Solution Technologies, LLC, Horseheads, NY (US)

( * ) Notice: Subject to any disclaimer, the term of this patent is extended or adjusted under 35 U.S.C. 154(b) by 0 days.

(21) Appl. No.: 18/431,135

(22) Filed: Feb. 2, 2024

(65) Prior Publication Data

US 2024/0271554 A1 Aug. 15, 2024

Related U.S. Application Data

(60) Provisional application No. 63/444,636, filed on Feb. 10, 2023.

(51) Int. Cl.
*F01N 3/08* (2006.01)
*F01N 3/033* (2006.01)
(Continued)

(52) U.S. Cl.
CPC ........... *F01N 3/0892* (2013.01); *F01N 3/033* (2013.01); *F01N 3/208* (2013.01); *F01N 9/00* (2013.01);
(Continued)

(58) Field of Classification Search
CPC ........ F01N 3/01; F01N 3/0892; F01N 3/0256; F01N 3/027; F01N 3/0275; F01N 3/033;
(Continued)

(56) References Cited

U.S. PATENT DOCUMENTS

2006/0064967 A1* 3/2006 Frank .................. F02D 41/0255 60/284
2007/0028905 A1* 2/2007 Shinagawa ............... C01B 3/26 123/575
(Continued)

OTHER PUBLICATIONS

Industrial Fire World, Ward Diesel's Exhaust After-Treatment Device, Oct. 1, 2016, 3 pages, https://www.industrialfireworld.com/530753/ward-diesel.
(Continued)

*Primary Examiner* — Binh Q Tran
(74) *Attorney, Agent, or Firm* — Barnes & Thornburg LLP

(57) ABSTRACT

A system for removing effluents from the exhaust gases of an engine includes an auxiliary occupational emissions device positioned downstream of a vehicle-regulated emission abatement system. One or more glow plugs is positioned between the vehicle-regulated emission abatement system and the auxiliary occupational emissions device. The glow plugs are operable to heat exhaust gases exiting the vehicle-regulated emission abatement system prior to advancement into the auxiliary occupational emissions device. A method of lighting off an auxiliary occupational emissions device is also disclosed.

20 Claims, 2 Drawing Sheets

(51) Int. Cl.

| | |
|---|---|
| ***F01N 3/20*** | (2006.01) |
| ***F01N 9/00*** | (2006.01) |
| ***F01N 13/00*** | (2010.01) |
| ***F02P 19/02*** | (2006.01) |

(52) U.S. Cl.
CPC .......... *F01N 13/009* (2014.06); *F01N 3/2013* (2013.01); *F01N 3/204* (2013.01); *F01N 2240/04* (2013.01); *F01N 2240/05* (2013.01); *F01N 2240/16* (2013.01); *F01N 2610/105* (2013.01); *F01N 2610/107* (2013.01); *F01N 2900/0602* (2013.01); *F02P 19/02* (2013.01); *F02P 19/023* (2013.01); *F02P 19/026* (2013.01); *F02P 19/027* (2013.01)

(58) Field of Classification Search
CPC .... F01N 3/2006; F01N 3/2013; F01N 3/2026; F01N 3/204; F01N 3/208; F01N 9/00; F01N 13/009; F01N 2240/04; F01N 2240/05; F01N 2240/16; F01N 2550/22; F01N 2610/105; F01N 2610/107; F01N 2900/0602; F02P 9/002; F02P 9/007; F02P 15/002; F02P 19/02; F02P 19/021; F02P 19/023; F02P 19/025; F02P 19/026; F02P 19/027; F02P 19/028
See application file for complete search history.

(56) References Cited

U.S. PATENT DOCUMENTS

| | | | | |
|---|---|---|---|---|
| 2012/0073274 | A1* | 3/2012 | Uno ...................... | F01N 3/2033 60/299 |
| 2012/0301365 | A1* | 11/2012 | Hanada ............... | F01N 13/0097 422/173 |
| 2013/0180232 | A1* | 7/2013 | Shinoda .................... | F01N 3/10 60/300 |
| 2013/0276437 | A1* | 10/2013 | Iwasaki ................... | F01N 3/103 60/303 |
| 2015/0315947 | A1* | 11/2015 | Tsujimoto ............. | F02D 41/068 701/103 |

OTHER PUBLICATIONS

Fire Apparatus & Emergency Equipment, Ward Diesel Removes Soot By Filtration System, Feb. 1, 2007, 2 pages, https://www.fireapparatusmagazine.com/technology/ward-diesel-removes-soot-by-filtration-system/#gref.

* cited by examiner

SYSTEM FOR LIGHTING OFF AN AUXILIARY OCCUPATIONAL EMISSIONS DEVICE AND METHOD OF OPERATING THE SAME

This application claims priority under 35 U.S. C. § 119 to U.S. Provisional Patent Application Ser. No. 63/444,636 which was filed on Feb. 10, 2023 and is hereby incorporated herein by reference.

TECHNICAL FIELD

The present disclosure relates generally to emission abatement devices, and more particularly to a system and method for lighting off an auxiliary occupational emissions device.

BACKGROUND

Untreated internal combustion engine emissions include various effluents such as oxides of nitrogen (NOx), hydrocarbons (HC), and carbon monoxide (CO), for example. Moreover, the untreated emissions from certain types of internal combustion engines, such as diesel engines, also include particulate carbon-based soot. Federal regulations relating to emission standards for such effluents promulgated from the Environmental Protection Agency (EPA) mandate the use of emission abatement devices such as oxidation catalysts, selective catalytic reduction (SCR) devices, and diesel particulate filters (DPF) by the original equipment manufacturer (OEM) of the engine. These standards, commonly referred to as "tailpipe emission standards," specify the maximum amount of pollutants allowed in exhaust gases discharged from an internal combustion engine. Tailpipe emission standards were first introduced in California in the late 1950s to control CO and HC emissions from gasoline engines. Today, emissions from internal combustion engines are regulated in many countries throughout the world in regard to many pollutants including NOx, HC, CO, and soot.

Applications of internal combustion engines in confined spaces are regulated through occupational health and safety ambient air quality standards rather than (or in addition to) the tailpipe regulations. For example, in the operation of some vehicles, such as firetrucks and other first responder vehicles, personnel may be exposed to exhaust gases during the course of their work. The ambient air quality standards specify maximum concentrations of air contaminants—known as Permissible Exposure Limits (PELs)—which are allowed in the workplace. Gases found in engine emissions including CO, NOx, oxides of sulfur (SOx), soot, and numerous other compounds have their PELs set by governmental occupational health and safety authorities. Of interest, the duty to comply is on the end-user (fire department, factory operator, etcetera.). In other words, the end-user (as opposed to the engine manufacturer) ensures that adequate emission control measures are employed. Typically, engine or vehicle manufacturers do not have any direct obligations in regard to the occupational health and safety air quality standards.

For example, in the case of a firetruck, firefighters may be exposed to exhaust gases from the firetruck as the truck is being prepped to leave, or returning to, the fire station, or at the scene of an emergency. Although the exhaust gases of the truck's engine have been treated to the relevant EPA tailpipe emissions standards by the firetruck's OEM emissions system, some levels of certain effluents remain in the exhaust gas exiting the truck's tailpipe. In an effort to prevent personnel from being exposed to such remaining effluents, firetrucks (and other vehicles) may be equipped with an auxiliary occupational emissions device. An auxiliary occupational emissions device is located downstream of the OEM emissions system and further treats the exhaust gases exiting the OEM emissions system prior to discharge of the exhaust gases through the vehicle's tailpipe. Auxiliary occupational emissions devices may take the form of an oxidation catalyst and filter that is operable to treat the remaining amounts of certain effluents in the exhaust gases exiting the OEM emissions system such that the further treated exhaust gases meet the even stricter occupational standards (relative to EPA standards) promulgated by The Occupational Safety and Health Administration (OSHA), The National Institute for Occupational Safety and Health (NIOSH), and/or The National Fire Protection Association (NFPA).

SUMMARY

According to one aspect, a system for removing effluents from the exhaust gases of an engine includes an auxiliary occupational emissions device positioned downstream of a vehicle-regulated emission abatement system. One or more glow plugs is positioned between the vehicle-regulated emission abatement system and the auxiliary occupational emissions device. The glow plugs are operable to heat exhaust gases exiting the vehicle-regulated emission abatement system prior to advancement into the auxiliary occupational emissions device.

The system may further include a control circuit electrically coupled to the glow plugs. The control circuit is operable to selectively activate the glow plugs.

In an embodiment, the vehicle-regulated emission abatement system includes an oxidation catalyst. In such an embodiment, the oxidation catalyst may be embodied as a diesel oxidation catalyst.

In an embodiment, the vehicle-regulated emission abatement system includes a diesel particulate filter.

In an embodiment, the vehicle-regulated emission abatement system includes a selective catalytic reduction (SCR) device.

According to another aspect, a method of treating exhaust gases exiting an internal combustion engine includes advancing exhaust gases from the engine through a vehicle-regulated emission abatement system. Exhaust gases exiting the vehicle-regulated emission abatement system are heated by one or more glow plugs and thereafter advanced through an auxiliary occupational emissions device.

In an embodiment, the vehicle-regulated emission abatement system includes an oxidation catalyst. In such an embodiment, the oxidation catalyst may be embodied as a diesel oxidation catalyst.

In an embodiment, the vehicle-regulated emission abatement system includes a diesel particulate filter.

In an embodiment, the vehicle-regulated emission abatement system includes a selective catalytic reduction (SCR) device.

BRIEF DESCRIPTION OF THE DRAWINGS

The detailed description particularly refers to the following figures, in which.

DETAILED DESCRIPTION OF THE DRAWINGS

Figure 1:
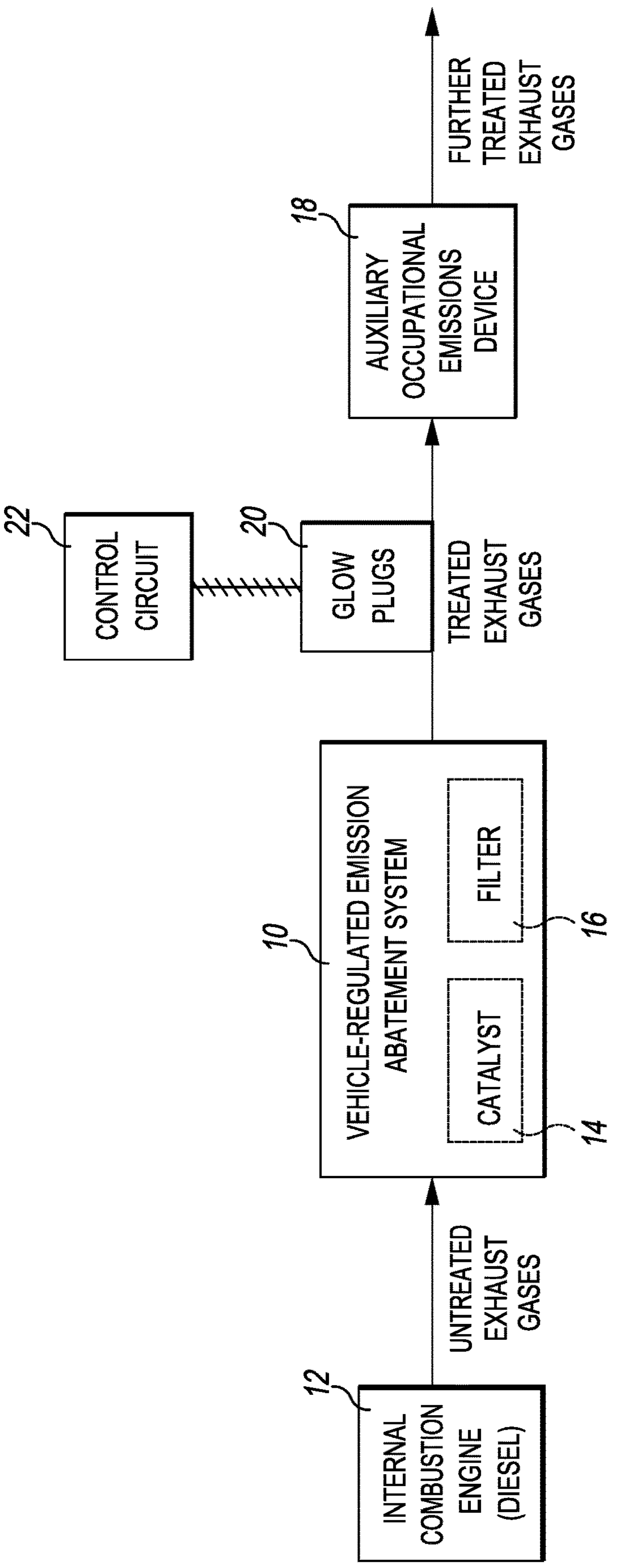
FIG. 1 is a block diagram which demonstrates the concepts of the present disclosure for treating exhaust gases from a diesel engine.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, there is shown a vehicle-regulated emission abatement system 10 for removing effluents, such as NOx, HC, CO, and soot (e.g., particulate matter (PM)), from the exhaust gases of an internal combustion engine 12, such as a diesel engine. What is meant herein by the term "vehicle-regulated emission abatement system" is the emission system utilized by the OEM (or aftermarket outfitter) to treat exhaust gases from the internal combustion engine to meet vehicle tailpipe emissions regulated by the EPA and/or other federal and/or state environmental agencies. The vehicle-regulated emission abatement system 10 includes a catalyst 14 and a soot filter 16. The oxidation catalyst 14 is used to remove certain compounds from the exhaust gases of the engine 12. In particular, the oxidation catalyst 14 may be configured as a diesel oxidation catalyst to catalyze, in the presence of heat supplied by the exhaust gasses (e.g., 250 degrees Celsius), an oxidation reaction which converts, for example, HC, CO, and NOx into water vapor, carbon dioxide, and other less toxic gases.

The soot filter 16 includes a filter substrate that traps soot particulates in the exhaust gases of the engine 12. The soot particulates build up in the filter 16 and are subsequently removed during a regeneration process. Specifically, once the trap nears saturation, heat—which may illustratively be in the range of 600-650 degrees Celsius—raises the temperature of the soot particles trapped in the filter 16 to a temperature sufficient to ignite the particles thereby regenerating the filter 16. In some embodiments, the soot filter 16 may be passively regenerated without the addition of heat beyond that which is present in the exhaust gases of the engine 12.

It should be appreciated that the vehicle-regulated emission abatement system 10 may include other types of treatment devices, such as a SCR device. In any such configuration, exhaust gases exiting the vehicle-regulated emission abatement system 10 meet the relevant tailpipe emissions standards.

As shown in FIG. 1, an auxiliary occupational emissions device 18 is positioned downstream of the vehicle-regulated emission abatement system 10. Thus, treated exhaust gases from the vehicle-regulated emission abatement system 10 are advanced into the auxiliary occupational emissions device 18 for further treatment therefrom. What is meant herein by the term "auxiliary occupational emissions device" is an emissions treatment device that is supplemental to, but separate from, the vehicle-regulated emission abatement system and is operable to further treat exhaust gases to meet occupational PEL standards regulated by OSHA, NIOSH, and/or other federal and/or state occupational and health agencies.

The auxiliary occupational emissions device 18 is embodied as a flow through filter that includes, amongst other things, a platinum and palladium based catalytic substrate that catalytically treats NOx, SOx, HC, and CO and also traps soot. By being placed downstream from the vehicle-regulated emission abatement system 10, the auxiliary occupational emissions device 18 is regenerated during regeneration of the vehicle-regulated emission abatement system 10. In the illustrative embodiment described herein, the catalytic design of the auxiliary occupational emissions device 18 is configured to meet the OSHA standards applicable for use on a heavy vehicle, such as a firetruck, operating in a confined space. In this specific illustrative example, OSHA measures and mandates the following PELs over a time-weighted average 8 hour day: CO (35 PPM), SO2 (5 PPM), PNAs (1 PPM), soot (aka diesel particulate matter—1 PPM), NO (25 PPM), and NO2 (5 PPM). Accordingly, the catalytic design of the auxiliary occupational emissions device 18 is specifically configured to treat the exhaust gases exiting from the vehicle-regulated emission abatement system 10 to these enhanced levels prior to discharge out of the firetruck's tailpipe. Commercially available devices suitable for use as the auxiliary occupational emissions device 18 in a given system design are sold under the tradenames "NO SMOKE" and/or "NO SMOKE 2" and/or "NO SMOKE G" and/or "NO SMOKE for Gas" from Beecher Emission Solution Technologies, LLC (DBA: Ward Diesel Filter Systems) of Horseheads, New York.

The catalytic design of the auxiliary occupational emissions device 18 is also specifically configured to provide for light off of the auxiliary occupational emissions device 18 at relatively low temperatures. In particular, as with conventional aftertreatment catalytic devices, full functionality of the catalysts of an auxiliary occupational emissions device 18 is generally not achieved until the exhaust gases produced by the engine 12 become hot enough to heat the auxiliary occupational emissions device 18 to its light off temperature (e.g., approximately 88 degrees Celsius in one illustrative catalytic design). Such low temperatures can occur during cold starts, low idling, or on-scene operation of the engine 12 and can result in undesirable levels of certain compounds passing untreated through the system. As such, the catalytic design of the auxiliary occupational emissions device 18 can be specifically configured to operate within the expected temperature range of exhaust gases of a given system.

To further limit the occurrences of exhaust gases passing through the auxiliary occupational emissions device 18 prior to the device 18 reaching its light off temperature, one or more glow plugs 20 are positioned in the exhaust pipe at a location between the vehicle-regulated emission abatement system 10 and the auxiliary occupational emissions device 18. The glow plugs 20 may be actuated during periods of low exhaust gas temperatures to heat the exhaust gases entering the auxiliary occupational emissions device 18 thereby lighting off the auxiliary occupational emissions device 18. For example, the glow plugs 20 may be actuated during engine startup to instantaneously, or near instantaneously, light off the auxiliary occupational emissions device 18. Specifically, during startup of the engine 12, the glow plugs 20 may be energized thereby quickly lighting off the catalysts within the auxiliary occupational emissions device 18 in a much shorter period of time than if the catalyst had to be lighted off solely by heat from the engine's exhaust gases passing therethrough. Such instantaneous, or near instantaneous, light off of the catalysts within the auxiliary occupational emissions device 18 prevents the release of untreated compounds during engine startup that the auxiliary occupational emissions device 18 is otherwise designed to treat.

Any number of glow plugs 20 may be utilized to fit the needs of a given system design. Moreover, the arrangement of the glow plugs 20 within the exhaust pipe may be altered to fit the needs of a given system design. In an illustrative embodiment, two glow plugs 20 are arranged radially opposite one another in the exhaust pipe.

As can be seen in FIG. 1, the glow plugs 20 are electrically coupled to a control circuit 22. The control circuit controls operation of the glow plugs 20. Specifically, the control circuit 22 selectively actuates and de-actuates the glow plugs 20 as needed to heat the exhaust gases entering the auxiliary occupational emissions device 18. In an illustrative embodiment, the control circuit 22 is embodied as an adjustable timed relay that is triggered by a signal on the vehicle's starter wire. The relay supplies power to the glow plugs 20 for a predetermined amount of time subsequent to detecting a vehicle startup (via the starter wire). In an illustrative embodiment, the relay of the control circuit 22 is configured to supply power to the glow plugs 20 for approximately 160 seconds after vehicle startup (or for a designated period of time during engine operation with low exhaust temperatures). It should be appreciated that the duration of the glow plug's operation many be altered to fit the needs of a given system design.

It should be appreciated that other types of control circuits 22 may also be used. For example, the glow plugs 20 may be operated by the vehicle's engine control module (ECM). Moreover, operation of the glow plugs 20 may be actuated based on a temperature sensor located in the exhaust system. The glow plugs 20 may also be operated in response to the vehicle's direction of travel—for example, the glow plugs 20 may be actuated when the vehicle is reversed since the same indicates the vehicle being backed into the station.

It should also be appreciated that the glow plugs 20 may be actuated at times other than vehicle startup. For example, the glow plugs 20 may be actuated if the engine 12 has been at idle for a predetermined amount of time. In essence, the control circuit 22 may be configured to operate the glow plugs 20 at any time low temperature exhaust gases are present in the auxiliary occupational emissions device 18.

Figure 2:
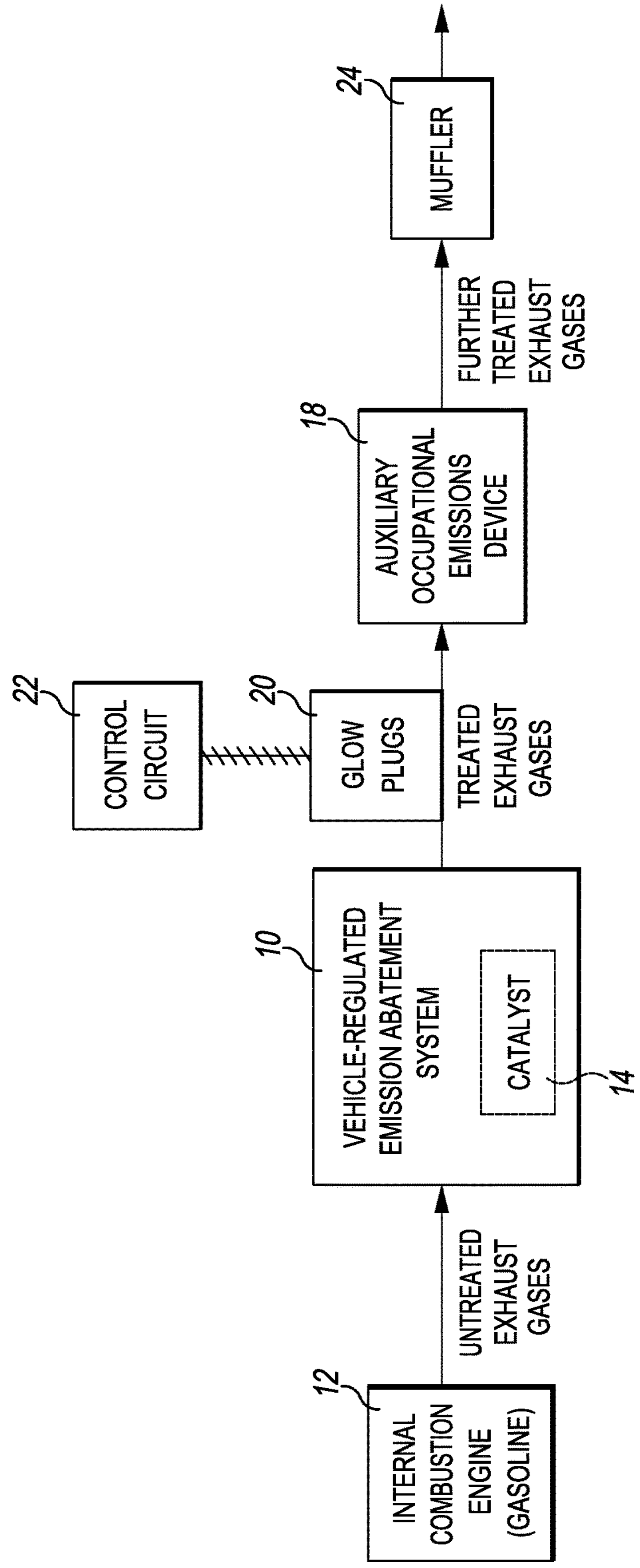
FIG. 2 is a block diagram which demonstrates the concepts of the present disclosure for treating exhaust gases from a gasoline engine.

It should be appreciated that although the system has herein been described in regard to a diesel engine, the concepts of the present disclosure may also be used in regard to a spark-ignited (e.g., gasoline) engine, as shown in FIG. 2. In such a case, certain devices of the upstream vehicle-regulated emission abatement system 10 may be altered or omitted. For example, in the case of a gasoline engine, the vehicle-regulated emission abatement system 10 may be embodied without a soot filter 16 and thus only include the catalyst 14 (i.e., a catalytic converter designed to treat effluents from a gasoline engine). Moreover, as also shown in FIG. 2, in the case of a gasoline engine, the treated exhaust gases exiting the auxiliary occupational emissions device 18 may be advanced through a muffler 24 prior to discharge thereof through the vehicle's tailpipe.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, it should be appreciated that although the electrically-actuated heat source for heating the exhaust gases entering the auxiliary occupational emissions device 18 (to light off the auxiliary occupational emissions device 18 when needed) is herein described as the glow plugs 20, and has significant advantages thereby in the design of the system, the electrically-actuated heat source may be embodied as other types of mechanisms and still enjoy certain of such advantages. For example, the electrically-actuated heat source for heating the exhaust gases entering the auxiliary occupational emissions device 18 may be embodied as a heat coil, a fuel doser and oxidation catalyst assembly, or other such devices.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. An apparatus for removing effluents from exhaust gases of an internal combustion engine, comprising:
- a vehicle-regulated emission abatement system configured to receive exhaust gases exiting the internal combustion engine,
- an auxiliary occupational emissions device positioned downstream of the vehicle-regulated emission abatement system to receive exhaust gases exiting the vehicle-regulated emission abatement system, and
- one or more glow plugs positioned between the vehicle-regulated emission abatement system and the auxiliary occupational emissions device, the glow plugs being operable to heat exhaust gases exiting the vehicle-regulated emission abatement system prior to entering the auxiliary occupational emissions device.

2. The apparatus of claim 1, further comprising a control circuit electrically coupled to the glow plugs, the control circuit being operable to selectively activate the glow plugs.

3. The apparatus of claim 2, wherein the control circuit is operable to selectively activate the glow plugs in response to startup of the internal combustion engine.

4. The apparatus of claim 1, wherein the vehicle-regulated emission abatement system comprises a diesel oxidation catalyst.

5. The apparatus of claim 1, wherein the vehicle-regulated emission abatement system comprises a diesel particulate filter.

6. The apparatus of claim 1, wherein the vehicle-regulated emission abatement system comprises a selective catalytic reduction (SCR) device.

7. A method of treating exhaust gases exiting an internal combustion engine, comprising:
- advancing exhaust gases from the engine through a vehicle-regulated emission abatement system to produce treated exhaust gases,
- heating the treated exhaust gases with one or more glow plugs, and
- advancing the heated, treated exhaust gasses through an auxiliary occupational emissions device.

8. The method of claim 7, wherein heating the treated exhaust gases comprises actuating the one or more glow plugs in response to startup of the engine.

9. The method of claim 7, wherein advancing exhaust gases from the engine through a vehicle-regulated emission abatement system comprises advancing exhaust gases from the engine through a diesel oxidation catalyst.

10. The method of claim 7, wherein advancing exhaust gases from the engine through a vehicle-regulated emission abatement system comprises advancing exhaust gases from the engine through a diesel particulate filter.

11. The method of claim 7, wherein advancing exhaust gases from the engine through a vehicle-regulated emission abatement system comprises advancing exhaust gases from the engine through a selective catalytic reduction (SCR) device.

12. An apparatus for removing effluents from exhaust gases of an internal combustion engine, comprising:

a vehicle-regulated emission abatement system configured to receive exhaust gases exiting the internal combustion engine, an auxiliary occupational emissions device positioned downstream of the vehicle-regulated emission abatement system to receive exhaust gases exiting the vehicle-regulated emission abatement system, and an electrically-actuated heat source positioned between the vehicle-regulated emission abatement system and the auxiliary occupational emissions device, the electrically-actuated heat source being operable to heat exhaust gases exiting the vehicle-regulated emission abatement system prior to entering the auxiliary occupational emissions device.

13. The apparatus of claim 12, further comprising a control circuit electrically coupled to the electrically-actuated heat source, the control circuit being operable to selectively activate the electrically-actuated heat source.

14. The apparatus of claim 12, wherein the control circuit is operable to selectively activate the electrically-actuated heat source in response to startup of the internal combustion engine.

15. The apparatus of claim 12, wherein the electrically-actuated heat source comprises one or more glow plugs.

16. The apparatus of claim 12, wherein the electrically-actuated heat source comprises one or more heat coils.

17. The apparatus of claim 12, wherein the electrically-actuated heat source comprises a fuel doser and oxidation catalyst assembly.

18. The apparatus of claim 12, wherein the vehicle-regulated emission abatement system comprises a diesel oxidation catalyst.

19. The apparatus of claim 12, wherein the vehicle-regulated emission abatement system comprises a diesel particulate filter.

20. The apparatus of claim 12, wherein the vehicle-regulated emission abatement system comprises a selective catalytic reduction (SCR) device.

* * * * *